United States Patent [19]

Hosokawa

[11] Patent Number: 4,575,777
[45] Date of Patent: Mar. 11, 1986

[54] MAGNETIC RECORDING AND REPRODUCING HEAD

[75] Inventor: Minoru Hosokawa, Suwa, Japan

[73] Assignee: Kabushiki Kaisha Suwa Seikosha, Tokyo, Japan

[21] Appl. No.: 446,119

[22] Filed: Dec. 2, 1982

[30] Foreign Application Priority Data

Dec. 8, 1981 [JP] Japan .................................. 56-197424
Dec. 25, 1981 [JP] Japan .................................. 56-210425
Dec. 28, 1981 [JP] Japan .................................. 56-213249

[51] Int. Cl.⁴ .............................................. G11B 5/20
[52] U.S. Cl. ..................................... 360/123; 360/110
[58] Field of Search ....................... 360/123, 111–113, 360/119–120, 121–122, 125–126

[56] References Cited

U.S. PATENT DOCUMENTS

3,057,967 10/1962 Clark .................................... 360/123
3,230,517 1/1966 Supernowicz ................... 360/123 X
3,497,633 2/1970 Rankin ............................. 360/119 X
4,286,299 8/1981 Shirahata et al. .................... 360/113
4,385,334 5/1983 Yanagida ......................... 360/123 X
4,423,450 12/1983 Hamilton ............................. 360/111

Primary Examiner—John H. Wolff
Attorney, Agent, or Firm—Blum, Kaplan, Friedman, Silberman & Beran

[57] ABSTRACT

A magnetic recording and reproducing head which operates in a perpendicular magnetization mode which records and reproduces information on a magnetic recording medium. The head includes first and second members spaced apart so as to define a gap therebetween through which said medium can travel. The first member includes a magnetic pole of high permeable magnetic thin film having a tip which faces the medium. A first coil is wound around the thin film and the second member includes a second coil. The tip of the thin film faces the second coil. The second member and its second coil and thin film are used for recording whereas the thin film and first coil are used for reproducing.

32 Claims, 36 Drawing Figures

MAGNETIC RECORDING AND REPRODUCING HEAD

BACKGROUND OF THE INVENTION

This invention is directed to a magnetic recording and reproducing head and, in particular, to a magnetic recording and reproducing head in which information or data is recorded on a magnetic recording medium by means of a magnetic flux in a direction perpendicular to the plane of the recording medium defined by the direction in which the recording medium travels.

Perpendicular magnetization has recently been proposed in order to achieve high recording density on a magnetic recording medium such as magnetic tape or magnetic discs. In order to obtain high recording density on a magnetic recording medium, the interval of magnetic recorded patterns is required to be shortened. Herein, the interval is defined as the pitch of inverting of the magnetic moments. As the interval becomes shorter, the recorded magnetization of the medium tends to be oriented more perpendicular to the medium surface. Thus, a magnetic head for high density recording is desired to form a magnetic flux in a direction perpendicular to the medium surface.

In general, a perpendicular magnetic recording is a system which records and reproduces in the direction of thickness of the magnetic recording medium, that is, in the direction perpendicular to the medium surface. Such a system is introduced and explained in detail in "A Study on a Prospect of Magnetic Recording—Possibilities of Perpendicular Magnetic Recording" found in the *Journal of Magnetics Society of Japan*, Vol. 1, No. 2, pages 5–11 (May 26, 1977). Additional information relating to magnetic heads which record by means of perpendicular magnetization can be found in Japanese laid-open Patent Publication Nos. 53-32009, 54-51810 and 54-51804 by Shunichi Iwasaki. U.S. Pat. No. 4,210,946 of Iwasaki et al. discloses a type of magnetic recording medium which is suitable for use in a recording system which operates in a perpendicular magnetization mode. U.S. Pat. No. 4,251,842 to Iwasaki et al. discloses one type of a magnetic recording and reproducing device in which recording on the recording medium is performed in a direction perpendicular to the recording medium plane.

Although the above-identified publications describe magnetic heads which record in the perpendicular direction, they have not all been put into practical use due to the difficulties thereof. A ring-type magnetic head has heretofore been available for magnetic recording in the longitudinal recording direction. A ring-type head of thin film has been recognized as the most practical head and is currently in popular use. However, a system which uses the conventional ring-type magnetic head fundamentally using the longitudinal magnetization mode has disadvantages in that the effective magnetic field distribution cannot be attained in the high density recording region. As aforenoted, although described in the above-identified publications, magnetic heads for perpendicular magnetization recording have been difficult to be put into practical use. Such heads are insufficient to detect data recorded at high density and are poor in efficiency and reproduction. In addition, such heads have little tolerance for the shift of position between a magnetic head and the recording track on the recording medium which is inevitable in such devices.

In order to obtain high density magnetic recording, a magnetic head having high permeability magnetic thin film such as Permalloy as a magnetic pole has recently been proposed instead of the conventional magnetic head using sintered ferrite such as Ni-Zn as a magnetic core. Further, a magnetic recording medium consisting of an alloy magnetic thin film of Co-Cr or the like formed by sputtering, evaporating or plating on a substrate has recently been coming into practical use instead of the conventional medium on which needle like crystal powders such as $Fe_2O_3$ are spread with a plastic binding material. The present invention is directed to magnetic recording and reproducing heads which record in the perpendicular mode. Based on the increasing use and acceptance of such heads, it is desired to provide an improved magnetic recording and reproducing head which records on a magnetic recording medium in a direction perpendicular to the plane of the recording medium.

SUMMARY OF THE INVENTION

Generally speaking, in accordance with the present invention, a magnetic recording and reproducing head for recording and reproducing information on a magnetic recording medium is provided. In a first embodiment, the magnetic recording and reproducing head includes first and second members spaced apart so as to define a gap therebetween through which the magnetic recording medium can travel. The first member includes a magnetic pole of high permeable magnetic thin film having a tip which faces the magnetic recording medium. A first coil is wound around the magnetic thin film. The second member includes a second coil with the tip of the magnetic thin film facing the second coil.

The first coil may be coupled to a reproducing circuit for reproducing signals detected by the first coil from the magnetic recording medium. The second coil may be coupled to a recording circuit for recording signals through the second coil on the magnetic recording medium.

Several different types and constructions of magnetic recording and reproducing heads which record information on the magnetic recording medium in a direction pependicular to the plane of the magnetic recording medium are disclosed in detail herein.

Accordingly, it is an object of the present invention to provide an improved magnetic recording and reproducing head.

Another object of the present invention is to provide an improved magnetic recording and reproducing head which records by means of perpendicular magnetization.

A further object of the present invention is to provide a magnetic recording and reproducing head which has a simplified structure.

A still further object of the present invention is to provide a magnetic recording and reproducing head which records and reproduces in high density.

Yet another object of the present invention is to provide a magnetic recording and reproducing head of high permeability magnetic thin film having tolerance in shift for the reproducing track position against the recording track position.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 10 through 13 are schematic views illustrating alternative constructions of magnetic recording and reproducing heads in accordance with the present invention;

FIGS. 14A through 17 are schematic views illustrating magnetic recording and reproducing heads constructed in accordance with alternative embodiments of the present invention; and FIGS. 18A through 23 are schematic views illustrating additional alternative embodiments of the magnetic recording and reproducing head of the present invention.

DESCRIPTION OF THE PREFERRED EMBODIMENTS

Figure 1A:
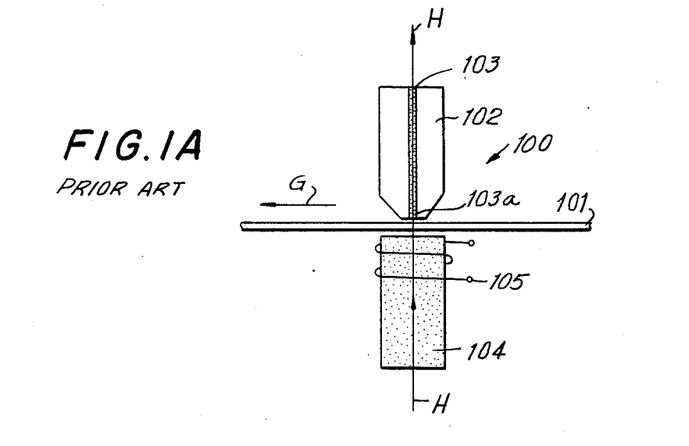
FIG. 1A is a schematic diagram illustrating a magnetic recording and reproducing head constructed in accordance with the prior art.

Reference is first made to FIG. 1A which depicts a recording medium 101 and a magnetic head, generally indicated at 100, for use in making a perpendicular magnetic recording. Development in recording technology has been attempted in such a structure. Magnetic recording medium 101 travels in the direction of arrow G by an appropriate winding mechanism against the position of head 100 during the recording and reproducing process. Magnetic head 100 is composed of a substrate 102 and a magnetic core 104 which face each other and are spaced to permit recording medium 101 to travel therebetween. A thin film 103 which is a main pole formed of a high magnetic permeability material such as a Permalloy film or about 1 μm in thickness is formed by plating, sputtering or the like and located proximately along the center of substrate 102 so that it is perpendicular to the planar surface of medium 101. Film 103 is sandwiched in substrate 102 as shown in FIG. 1A.

Magnetic core 104 is made of a material whose magnetic permeability is relatively high, such as Ni-Zn ferrite. A coil 105 for recording and reproducing is wound around core 104. At the time of recording information or data on medium 101, a magnetic flux induced by a recording current in coil 105 passes through medium 101 as shown by arrow H. Thus, the magnetic flux is especially concentrated at the point where medium 101 is in contact with magnetic film 103, resulting in that medium 101 is magnetized according to the recording information. In reproducing, coil 105 detects the change of the magnetic flux which is produced in the direction of arrow H in thin film 103 and core 104. This magnetic flux is produced by magnetized moments in medium 101, especially at the point where thin film 103 contacts medium 101.

The foregoing description is of a perpendicular magnetic recording system and a head structure which have been generally proposed. In such systems, as in the system shown in FIG. 1A, only the perpendicular component of the magnetic field to medium 101 is contributed to the recording and reproducing process, which is according to the principles of perpendicular recording theory.

Figure 1B:
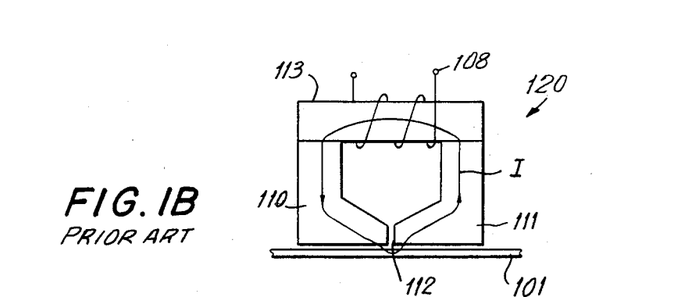
FIG. 1B is a schematic diagram illustrating a ring-type magnetic head constructed in accordance with the prior art.

FIG. 1B depicts a structure of a ring-type head, generally indicated at 120, which is widely used in longitudinal recording systems. Magnetic cores 110 and 111 which face medium 101 are adjacent to each other so as to form a gap 112. Cores 110 and 111 are connected their opposite sides so as to form a ring-core 113. A coil 108 for recording and reproducing is wound on ring-core 113. At the time of recording or reproducing, such a magnetic flux as shown by arrow I is produced in the ring-core. In recording, data is magnetically written on medium 101 adjacent to the end of gap 112. In reproducing, the difference between the flux in core 110 and that in core 111 among all flux produced by the recorded magnetization on medium 101 passes through coil 108.

In general, high magnetic premeable thin film 103 as shown in FIG. 1A is formed by evaporating or sputtering Permalloy or the like. If the end-surface, especially the edge at the extreme end 103a, of magnetic film 103 is fabricated into rectangular form, a high recording density can be achieved regardless of the thickness of magnetic film 103. However, the density of the magnetization which is allowed to be reproduced by the same magnetic film depends on the thickness of the magnetic film. It is known that the minimum interval of magnetic recorded patterns which can be reproduced is half as long as the thickness of magnetic film 103.

Similarly in reference to a ring-type head as shown in FIG. 1B, a half of the gap length of the medium is the minimum of the interval of magnetic recorded patterns which can be reproduced. However, in practice, the minimum of the desirable recorded interval is the value nearly equal to the thickness of magnetic film 103 or the gap length. According to the principles of perpendicular magnetic recording, the recording limit of minimum interval is an effective magnetizing domain, i.e. a few hundred Å. Converting this into the recording density, the recording limit is extended to several hundred KFRPI (kilo flux reversal per inch). As known among those who are skilled in the art, however, it is extremely difficult to form magnetic film 103 of some submicron in thickness and of great availability with superior magnetic characteristics. Contrary to this, it is relatively easy to make a thin film of the abovementioned thickness with a non-magnetic film. In fact, an effective gap width of 0.1 μm is attained in the structure shown in FIG. 1B. However, such a head of shape as in FIG. 1B cannot attain the high density recording level equivalent to that of a perpendicular recording head.

Figure 2:
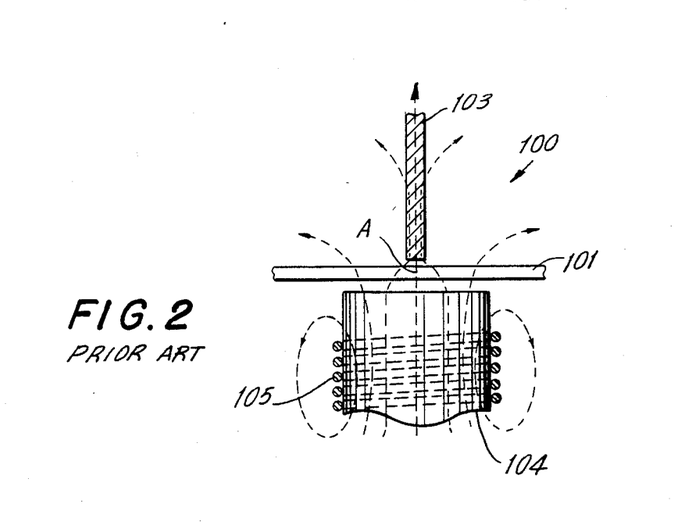
FIGS. 2, 3A, 3B and 4 schematically depict the lines of magnetic flux produced by the magnetic recording and reproducing head depicted in FIG. 1A.

FIG. 2 shows the directions of magnetic field, i.e. the flow of magnetic lines of force around magnetic head 100, when the recording current is applied to coil 105 of FIG. 1A. As shown in FIG. 2, the magnetic lines of force are concentrated near the portion indicated at A. As to reproducing, however, the reproducing efficiency of this head structure of FIG. 1A is extremely low. This malfunction of the reproducing process is explained according to FIGS. 3A, 3B and 4.

Figure 3A:
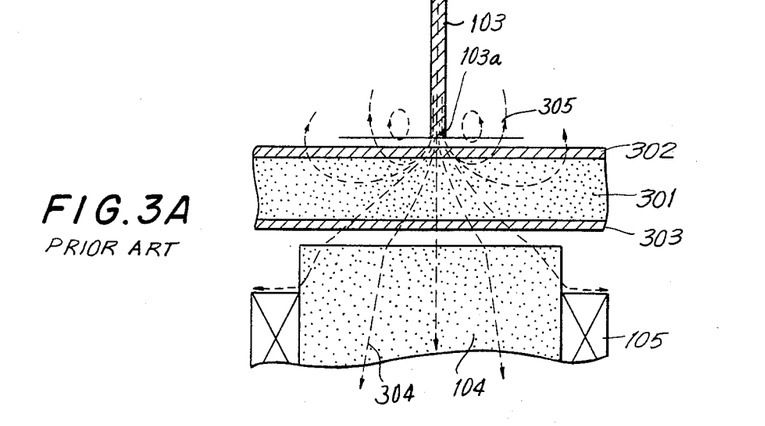
Figure 3B:
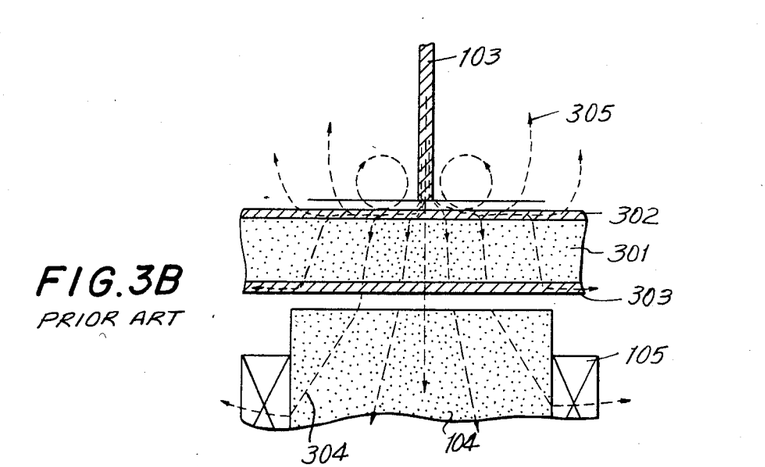

Depicted in FIGS. 3A and 3B is a substrate 301 of a magnetic recording medium. Substrate 301 is a sheet of flexible and plastic macromolecular resin such as polyethylene terephthalate, a hard disk such as aluminium alloy, or the like. On the surface of substrate 301, a thin magnetic film 302 as for the recording medium is formed. A similar magnetic thin film 303 of the recording medium may also be formed on the other surface of the substrate. In FIG. 3A, medium 302 is a single layer whereas as medium 302 in FIG. 3B is a double layer.

FIGS. 3A and 3B are at the time of reproducing, when the two magnetic heads are positioned on and under the medium. These figures show magnetic lines of force as dotted lines which are produced only by magnetization of that part of medium 302 which is directly under magnetic thin film 103. Magnetic lines of force from other parts of medium 302 are considered to be neglected, otherwise they are regarded to be zero. The efficiency of reproduction can be explained, alike, on the assumption mentioned above since only the part of magnetization on the medium being directly under magnetic thin film 103 contributes to the efficiency of reproduction, according to the head structure shown in FIG. 1A.

Figure 4:
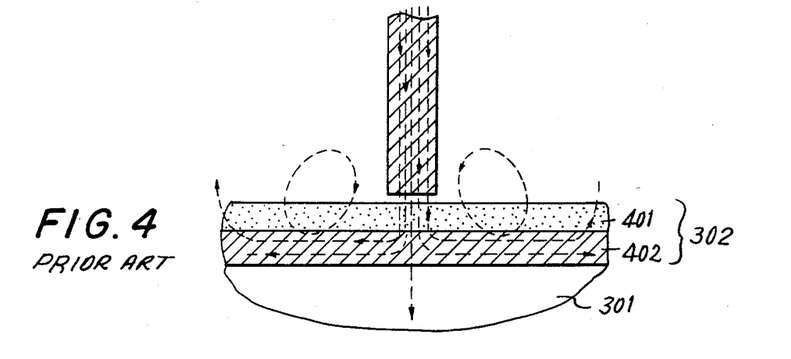

FIG. 4 is an enlarged view of the section where magnetic thin film 103 is adjacent to medium 302 in FIG. 3B. Medium 302 includes a high permeable magnetic thin film 402 and magnetic film for recording 401 which are formed on substrate 301. The recorded magnetization remains only in the first layer 401. A second layer 402 is formed for the purpose of enhancing recording and reproducing efficiency. As this layer 402 is made of high permeable film such as Permalloy, the magnetic flux flows into layer 402 as well as thin film 103. Accordingly, the flow of the magnetic flux in the double-layer mdium of FIG. 3B is different from that in the single-layer medium of FIG. 3A. In both cases of FIGS. 3A and 3B, there are two kinds of magnetic fluxes, one of which indicated as 304 penetrates coil 105 and the other of which indicated as 305 does not penetrate but closes into a loop. Therefore, the conventional head cannot attain efficient reproduction since magnetic flux which is provided by the recorded magnetization on the medium cannot be concentrated effectively into coil 105 at the time of reproducing. Especially, in the case of FIG. 3B, high magnetic permeable film 402 disturbs the reach of magnetic flux to coil 105. Thus, reproduction efficiency is worsened.

Figure 5A:
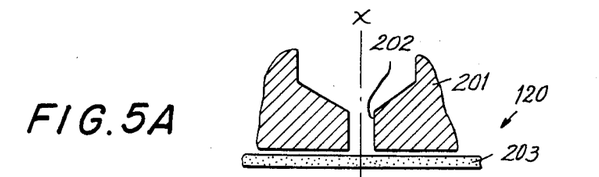
FIGS. 5A through 5D schematically depict the magnetic field distribution of a ring-type magnetic head.
Figure 5B:
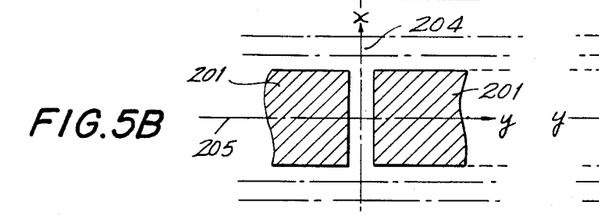

The magnetic field distribution produced on the recording medium surface at the time of recording is explained with reference to FIGS. 5A, 5B, 5C, 5D and 6A, 6B, 6C, 6D. FIGS. 5A, 5B, 5C and 5D show the magnetic field distribution produced in the case of a general ring-type head 120 of the type shown in FIG. 1B. Head 120 includes a magnetic core 201, and a gap 202 formed in core 201. A recording medium 203 is also shown. FIG. 5A is a cross-sectional view and FIG. 5B is a plan view of the head and medium. In FIG. 5B, the area where the head contacts the medium is shown by oblique lines. The direction in which the medium moves is indicated by arrow y and the direction of the track width is indicated by arrow x. The distribution of the recording magnetic field on the medium surface is shown by the two curves in FIGS. 5C and 5D. Curve 206 shows the magnetic field distribution in the y direction on the medium and curve 207 shows the magnetic field distribution in the x direction on the medium. The width of head 201 is indicated as 208, the effective recording track width is indicated as 209 and the demagnetization width is indicated as 210. The effective recording track width means the width of the track where recorded magnetic signals contribute substantially to reproducing, and demagnetization width means the track width where the recorded magnetization is eliminated before new magnetic signals are re-recorded.

Figure 6A:
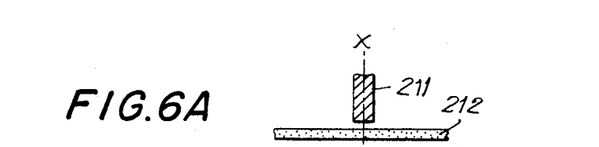
FIGS. 6A through 6D schematically depict the magnetic field distribution of a thin film magnetic pole in a magnetic head of the type relevant to the present invention.
Figures 6B, 6D:
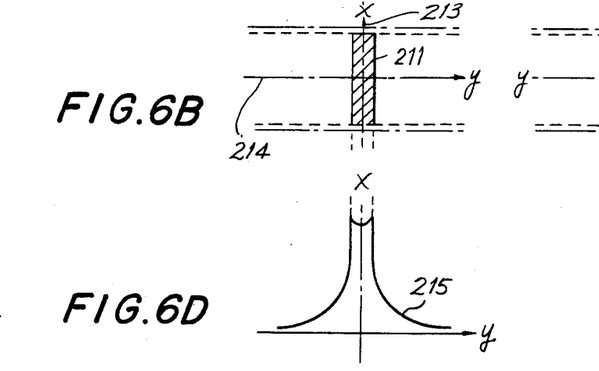
Figure 6C:
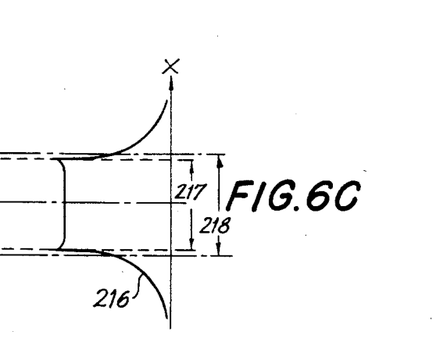

FIGS. 6A, 6B, 6C and 6D illustrate the recording magnetic field distribution produced by a magnetic thin film pole 211 of the type depicted in FIG. 1A. Similar to FIGS. 5A and 5B, FIG. 6A is a cross-sectional view and FIG. 6B is a plan view of the head and medium. FIGS. 6C and 6D show the recording magnetic field distribution in x and y directions, respectively. Depicted in FIG. 6A is a thin film pole 211 and a recording medium 212. In FIG. 6B, the area where head 211 contacts the medium 12 is shown by oblique lines. Curve 215 in FIG. 6D represents the magnetic field distribution produced in the center of medium 214 in the y direction and curve 216 in FIG. 6C represents the magnetic field distribution on a track 213 in the x direction. The width of the magnetic pole and that of the effective recording track are indicated by 217 and 218, respectively.

The difference between the magnetic field distributions of FIGS. 5A, 5B, 5C and 5D and 6A, 6B, 6C and 6D is now described under the practical recording condition. The following description is based upon the result induced from the simulation of numerical analysis of magnetic fields which corresponds well with practical data obtained by experiments. Also this description is based on the assumption that the tendency of characteristics of magnetic field distribution is known to those skilled in the art.

Figure 5C:
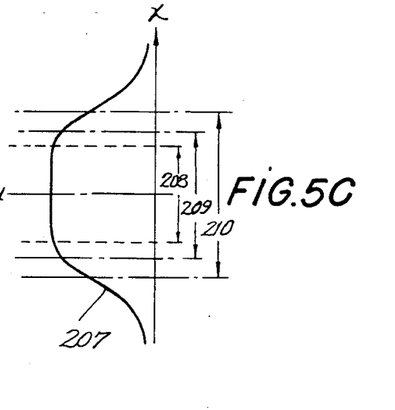
Figure 5D:
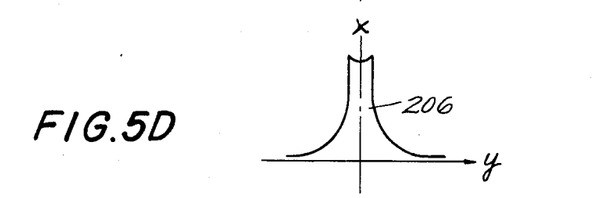

In FIG. 5C, the distribution 207 in the direction of the track width has an easy gradient. It results that the effective recording track width 209 is broader than the head width 208, with demagnetization width 210 being even broader. In general, the effective recording track width 209 and the demagnetization width 210 are broader than the head width 208 by a few $\mu$m and by 10 to 20 $\mu$m, respectively. On the other hand, the distribution in the direction of the track width 216 in FIG. 6C indicates a very sharp gradient and the effective recording width 218 is almost equal to width 217 which is the width of magnetic pole 211. There is no substantial difference of the distributed magnetic field in the y direction as shown by 206 and 215, respectively, between FIG. 5D and FIG. 6D.

Figure 7:
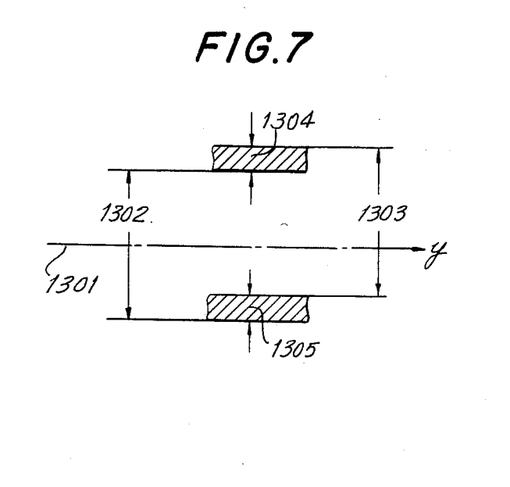
FIG. 7 depicts the shift of the recording track and the reproducing track from a magnetic head on a magnetic recording medium.

FIG. 7 shows the shift of the recording track position and the reproducing track position caused by the mechanical margin of the magnetic recording and reproducing drive or the variation of the environmental temperature or the humidity. Here, the recording track position means the area where the information is magnetically recorded on the medium by the magnetic recording head, and the reproducing track position means the area on the medium where the recorded information is detected by the reproducing head. A broken line 1301 shows the center of a recording track, and the medium moves in the direction as indicated by arrow y with respect to the head. The shift of the recording track position 1302 and the reproducing track position 1303 is unavoidable for both magnetic tapes and magnetic discs. Especially, in such a case as using one medium among some different recording and reproducing devices being interchangeable with each other, the shift of both of the track positions is considerably increased. Then, the shifts of the track shown by 1304 and 1305 influences the reproduced signals and reduces their reliability. The shift 1305 within the recording track width 1302 becomes invalid for reproducing, and at the same time, in the shift 1304, the signals not to be reproduced are detected in the reproducing process. In the conventional ring-type head having a bulk core, the same ring-type head is used for both recoridng and reproducing. In FIG. 5C, the demagnetizing width is 210, the recording track width is 209 and the reproducing track width is 208. Thus, the reproducing track position has some tolerance of shift in the direction of x against the recording track position. Also since the demagnetizing width is wider than the recording width, the reliability of reproduced signals are assured as long as the reproducing track position is within the demagnetizing track width.

In contrast with the ring-type head using a bulk core, the head using high permeability magnetic thin film as a magnetic pole represents a sharp curve of the magnetic field distribution in the direction of the track width as shown in FIGS. 6C and 6D. Both demagnetizing width and recording width are almost equal to the width of magnetic pole 217. Consequently, there is little tolerance in shift of the reproducing track position caused by the expansion of the magnetic field.

Figure 9:
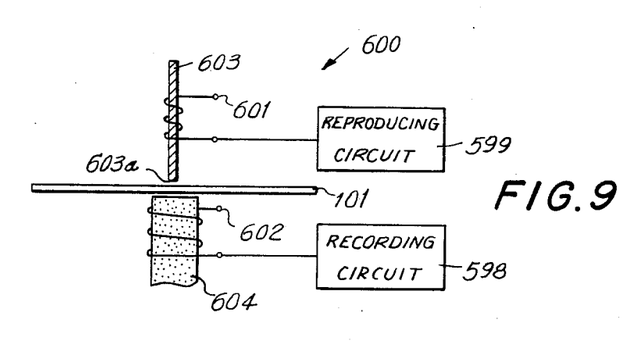
FIG. 9 is a schematic view of a magnetic recording and reproducing head constructed in accordance with the present invention.

FIG. 9 depicts one embodiment of a magnetic recording and reproducing head, generally indicated at 600, constructed in accordance with the present invention. Head 600 includes a high permeable magnetic thin film 603 (hereinafter referred to as a main pole) and a magnetic core 604. According to this invention, coils 601 and 602 are provided on both sides of the recording medium 101, respectively. As shown in FIG. 9, coil 601 is wound around main pole 603 and coil 602 is wound around lower core 604. However, it is not necessarily the winding of the coils that is of great importance in this invention. What is important is to allow most of the magnetic flux penetrating main pole 603 to also pass through coil 601 and to arrange the main pole tip 603a to the center position of coil 602 through medium 101. Coil 602 is coupled to a recording circuit 598 at the time of recording and coil 601 is coupled to a reproducing circuit 599 at the time of reproducing.

In FIGS. 3A and 3B, nearly all of the magnetic flux provided by the recorded magnetization on the medium pass through the main pole tip 103a adjacent to the medium but few of them penetrate coil 105 as described hereinabove. In the case of this invention, the greater amount of the magnetic flux passes through coil 601 shown in FIG. 9 compared with the flux through coil 602. Thus, this greater amount of flux can be contributed to the reproduction of signal more effectively through coil 601. This leads to the improvement in the efficiency of reproduction.

Figure 8:
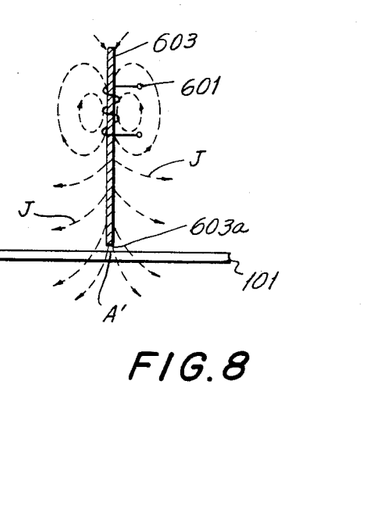
FIG. 8 schematically depicts the lines of magnetic flux in a magnetic recording head constructed in accordance with the principles of the present invention.

FIG. 8 represents the flow of the magnetic lines of force assuning that recording current is applied to coil 601. In this case, the far part 603a of magnetic pole 603 from the coil 601, the tip of the main pole, magnetizes medium 101. At the recording point of A', the magnetic flux cannot be concentrated as shown in FIG. 3A, but is weakened. Besides, the volume of saturated magnetic flux which passes through pole 603 is less than that passing through bulk magnetic core 104 of FIG. 2 since main pole 603 is a thin film.

Consequently in order to induce enough magnetic flux for recording into the tip 603a of main pole 603 in FIG. 8, an excessive recording current is needed to be applied to coil 601. However, most of the magnetic flux leaks out as indicated by arrows J from main pole 603 before reaching the medium. This means that magnetic recording by energizing coil 601 is less efficient than by energizing coil 602. Therefore, this invention provides high efficient recording and reproducing magnetic heads where coil 602 opposite to main pole 603 magnetizes medium 101 in the recording process and coil 601 wound around main pole 603 detects the magnetic flux in the reproducing process.

Figure 10:
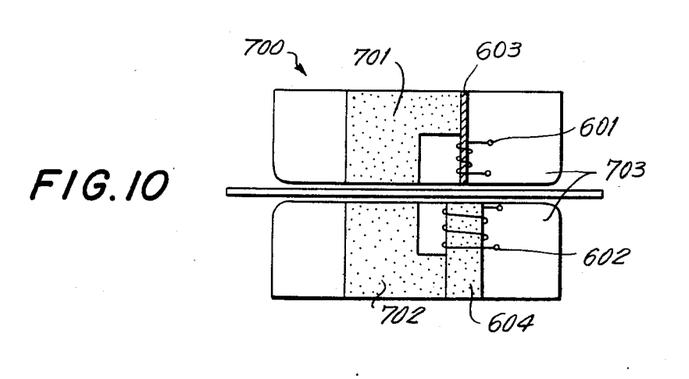
Figure 11A:
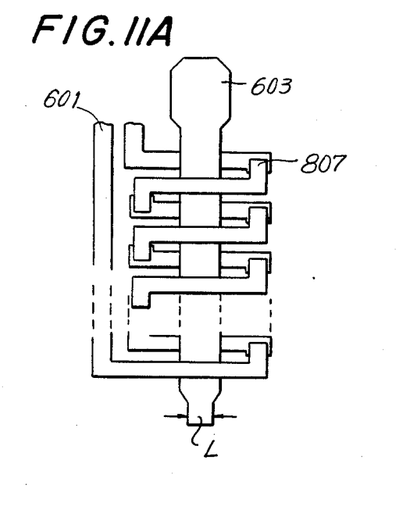
Figure 11B:
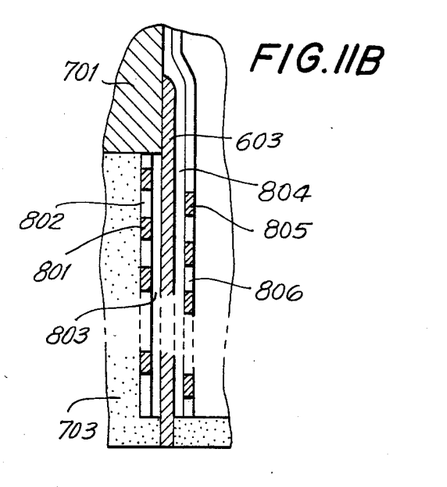

FIG. 10 depicts another embodiment of a head structure, generally indicated at 700, according to this invention. Magnetic cores 701 and 702 are provided on the side of main pole 603 and magnetic core 604, respectively, so as to loop the flux produced at the times of recording and reproducing within the magnetic core. Besides, the magnetic cores and the coils are assembled into a head with non-magnetic material 703 therearound. The detailed structures of main pole 603 and coil 601 are shown in FIGS. 11A and 11B. FIG. 11A shows main pole 603 and coil 601 viewed in the direction of the recording track width and FIG. 11B is a cross-sectional view taken along the middle of FIG. 11A. The thickness of main pole 603 is preferably 0.1 to 1 $\mu$m and the width L of its tip, i.e. the recording track width, is on the order of 10 $\mu$m. Also depicted is a conducting layer 801 below pole 603 and a conducting layer 805 above pole 603 for assembling coil 601. Insulating layers 803 and 804 insulate coil 601 from pole 603 which is made of conductive material such as Permalloy. Layers 802 and 806 are provided for covering the steps of conducting layers 801 and 805.

Figure 12A:
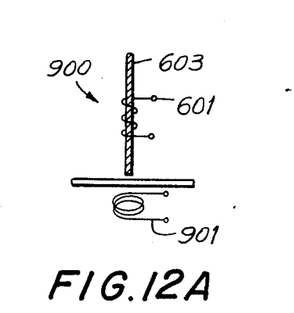

FIG. 12A depicts a head structure 900 in accordance with an alternative embodiment of the invention. Head 900 includes a recording coil 901 with substantially no magnetic core. As is apparent from FIGS. 3A and 3B, core 104 is provided to increase the flux passing through coil 105 in the reproducing process but has nothing to do with recording efficiency. According to this embodiment of the invention, therefore, the head structure can be simplified by providing a recording coil 901 with no magnetic core.

Figure 12B:
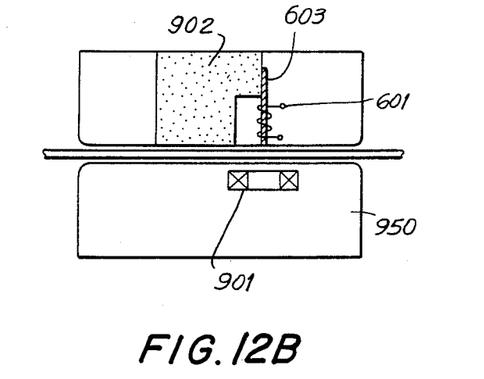

A practical head structure structure of the type shown in FIG. 12A is shown in FIG. 12B. Lower head 950 has coil 901 embedded into non-magnetic material. In the case of the recording and reproducing device in which the head contacts with the recording medium, lower head 950 can be made in one body by molding coil 901 with non-magnetic material such as a lubricant of molybdenum disulfide and bonding resin. On the side of main pole 603, core 902 is provided just like core 701 of FIG. 10.

Figure 13:
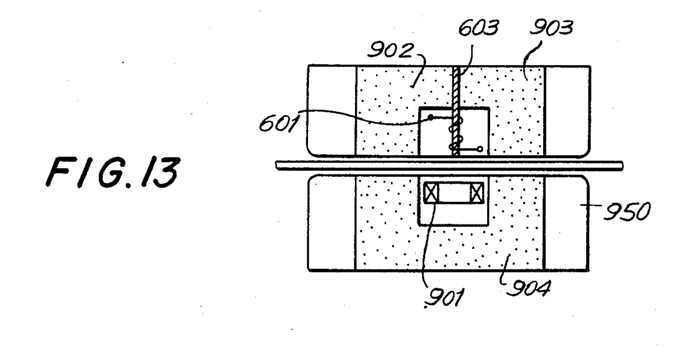

In another embodiment as depicted in FIG. 13 according to this invention, cores 903 and 902 are arranged symmetrically about main pole 603. Lower head 950 has magnetic core 904 surrounding coil 901.

Figure 14A:
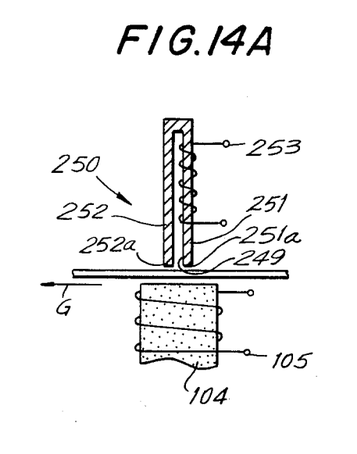

Reference is now made to FIG. 14A which depicts the construction of another magnetic head, generally indicated at 250, constructed in accordance with an alternative embodiment of the present invention. There are high permeable thin films 251 and 252 instead of magnetic film 103 of FIG. 1A. Films 251 and 252 form a gap 249 at the portion facing medium 101 and they are connected to each other at their opposite ends. Thus, thin films 251 and 252 form a ring-type head. A coil 253 for reproducing is wound around magnetic film 251. The two magnetic thin films 251 and 252 face to magnetic core 104 which is on the opposite side of medium 101. Core 104 has coil 105 for recording wound therearound. At the time of recording by the effect of applying a recording current through coil 105, the recording magnetic field is provided and the magnetic flux is concentrated at the edge portions 251a and 252a, respectively, of magnetic thin films 251 and 252. As a result, data is magnetically recorded on medium 101 adjacent to the edge portions.

As medium 101 travels in the direction as shown by arrow G similarly to FIG. 1A, medium 101 is finally magnetized at the edge portion of the films against the direction into which the head moves, i.e. the left side of magnetic thin film 252. Consequently, the thickness of both magnetic films 251 and 252 has nothing to do with recording density. At the time of reproducing, the flux is leaked to the surface of magnetic films 251 and 252 facing to the medium on account of the magnetization on the medium. Since the magnetic films form a ring-type head, the magnetic flux which is applied to coil 253 corresponds to the recorded magnetization on medium 101 between magnetic films 251 and 252. Consequently, the magnetization around gap 249 can be reproduced by detecting the current induced to the terminal of coil 253.

Figure 14B:
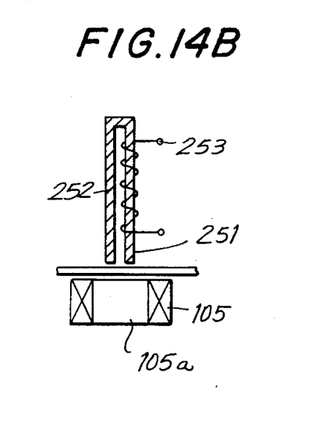

FIG. 14B depicts an example wherein a lower head 105 a has no magnetic core, but only has a magnetic coil 105.

Figure 15A:
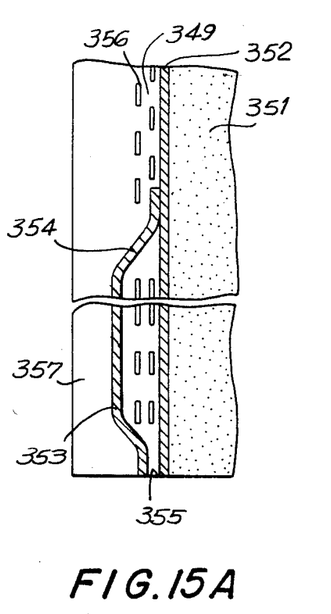
Figure 15B:
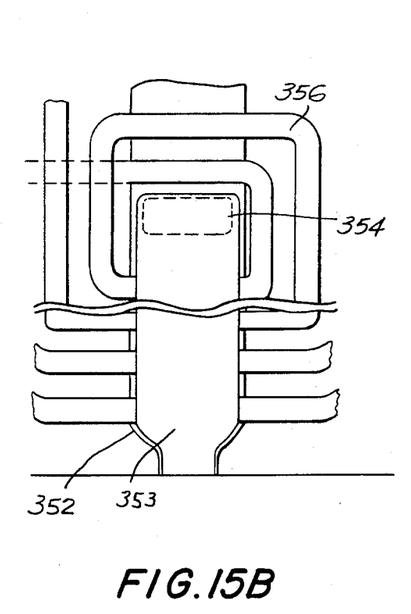

FIGS. 15A and 15B illustrate a detailed view of the upper head of FIG. 14A. FIG. 15A is a cross-section and FIG. 15B is a plan view. In this case, films 251 and 252 and coil 253 are all made of thin film. A first magnetic film 352 which is made of Permalloy or the like is formed on a non-magnetic base 351 of barium titanate or the like. On magnetic film 352, a conducting thin film 356 of aluminium, copper or the like is formed holding an insulating layer 349 therebetween. This conducting thin film 356 serves as the coil 253 of FIG. 14A.

FIGS. 15A and 15B illustrate an example in which the coil consists of double conducting layers. Conductor 356 is spiral and has 354 as a center thereof. This spiral coil of thin film is well known to those who are skilled in the art. A second magnetic thin film 353 is formed on the layer of conducting coil 356 through insulating layer 349. The insulating layer around the portion 354 is removed so that film 353 is connected to first magnetic film 352 at the portion 354. A gap 355 is formed by making insulating layer 349 thin at the portion facing to the medium. Then, protecting layer 357 is formed on second magnetic film 353.

In FIGS. 14A, 14B, 15A and 15B, the thickness of the film may be 0.5 to 2 μm on account of easy manufacturing since the thickness of both magnetic films has no connection with the recording density as described hereinabove. However, the gap should be as narrow as possible in length since the reproducing ability is determined by the length of gap 355 in FIG. 15A. As an example of a manufacturing process, an SiO₂ film of the same thickness as the desired gap length is formed on first magnetic layer 352, and then another insulating layer like a photo resist is formed on the SiO₂ film. Then, the photo resist layer is removed by etching only at the portion of gap 355 leaving the remaining SiO₂ layer alone before the formation of the second magnetic film. Thus, the length of the gap can be as narrow as desired.

Figure 16:
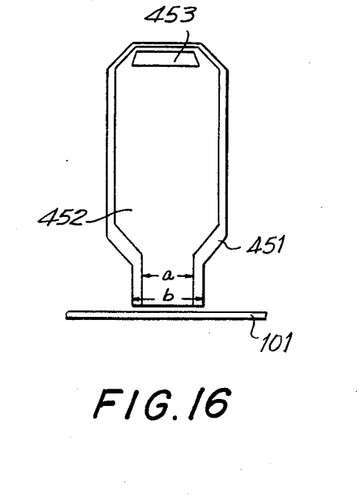

On the side facing to the medium, the length of both magnetic films in the direction of the track width is basically the same. FIG. 16 shows an embodiment in which the length of the first and second magnetic films in the direction of the track width is different from each other. Magnetic films 451 and 452 are those viewed in the direction of the track width, corresponding to 352 and 353 in FIGS. 15A and 15B, respectively. Magnetic films 451 and 452 are connected to each other at the portion 453 likewise to 354 in FIGS. 15A and 15B. The width of film 451 and that of 452 are different at the portion facing to the medium 101 as shown by a and b in the drawing. If magnetic film 451 is the rear side with reference to the direction in which the head proceeds, the recording track width on the medium is b and the reproducing track width is a. In other words, b-a can be provided for tolerance of the variation in position of the reproducing track against the recording track width.

Figure 17:
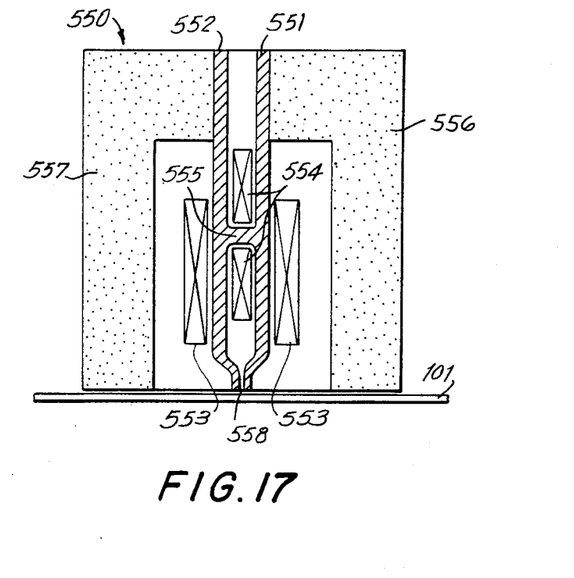

FIG. 17 depicts a structure with reference to another embodiment of this invention. A head 550 includes first and second magnetic films 551 and 552. These films form a gap at the portion 558 and are connected at the portion 555. A reproducing coil 554 is wound on portion 555 to make it a magnetic core, while a recording coil 553 is wound around both magnetic films 551 and 555 to make them a magnetic core. As shown in FIG. 17, there is no lower head which faces to the magnetic film through medium 101.

It is not necessary that the shape of head 550 be symmetrical as shown in FIG. 17. An improvement is provided relative to the recording-reproducing characteristic or signal-to-noise ratio by providing a magnetic core material 556 and 557 as illustrated in FIG. 17. The magnetic core material can be unilateral. The unilateral magnetic core is especially effective at the time of constructing a floating head slider. Considering the case where the coil for recording is wound around the magnetic film in FIG. 17, it is effective to lessen the width of the magnetic film at the end portion facing to the medium for making a strong magnetic field therearound.

Figure 18A:
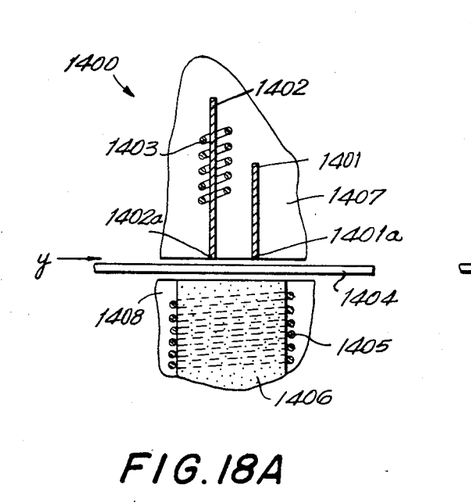
Figure 18B:
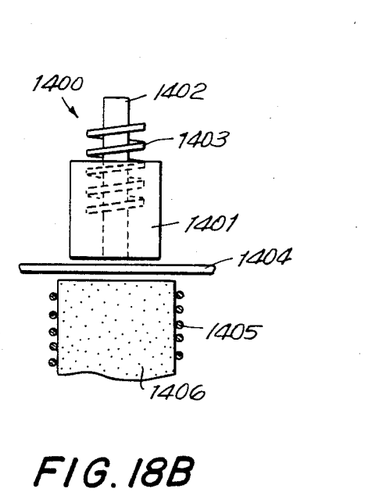

FIGS. 18A and 18B depict another embodiment of a head 1400 constructed in accordance with another embodiment of the present invention. FIG. 18A is a cross-sectional view taken along the direction of the track and FIG. 18B is a cross-sectional view taken in the direction of the track width. Head 1400 includes high permeability magnetic thin films 1401 and 1402. Magnetic recording medium 1404 moves in the direction as shown by arrow y with respect to head 1400. Head 1400 also includes an upper head substrate 1407 and a magnetic core 1406 provided on the lower side of medium 1404. Magnetic core 1406 is made of bulk ferrite or the like. As shown in FIG. 18B, the width of magnetic film 1402 is narrower than that of magnetic film 1401 at the portion facing to medium 1404 and the center of magnetic thin film 1401 corresponds to that of magnetic thin film 1402 in the direction of the thin film width. The tips 1401a and 1402a of thin films 1401 and 1402, respectively, in contact with recording medium 1404, face to the end surface of magnetic core 1406 within its width through the medium. A coil 1405 for recording is wound around the magnetic core 1406, and a coil 1403 for reproducing is wound around magnetic thin film 1402. Magnetic film 1401 is better to be shorter than magnetic film 1402 with respect to the direction in which a head moves, i.e. the lateral direction to which the medium moves. In the recording process, the recording current through coil 1405 effects the magnetic flux to concentrate at the tips 1401a and 1402a facing to the medium 1404 of magnetic films 1401 and 1402 and, thus, magnetic signals are recorded at that point on the medium. Since magnetic film 1401 is positioned backward with respect to the direction into which the head moves, the medium maintains only data recorded at the tip 1401a of magnetic film 1401.

At the time of reproducing, the flux produced from the magnetization at the portion of the medium adjacent to magnetic films 1401 and 1402 passes through the two films. Reproduced signal can be detected by coil 1403 wound around the magnetic thin film 1402 at the portion of the medium adjacent to film 1402. The width of film 1402 at the portion adjacent to the medium is beforehand made to be narrower than that of film 1401 in order to give some tolerance in shift of track position in certain magnetic recording devices so that the reproducing track can be always settled within the recording track. For instance, considering FIGS. 5A-5D, the recording track width obtained by magnetic film 1401 is made to be equivalent to the demagnetizing width 210 and the reproducing track width of magnetic thin film 1402 is made to be equivalent to the head width 208. This leads to the result that tolerance in shift of the reproducing track position against the recording track position of the head according to this invention is equal to that provided by the conventional ring-type head as shown in FIG. 5A.

Moreover, according to this invention, more tolerance in shift of track position than that by the conventional ring-type head can be obtained, provided the ratio of the recording track width by thin film 1401 to the reproducing track width by thin film 1402, that is, the ratio of the substantial width of thin films 1401 and 1402 at the portion facing to the medium, is made greater than the ratio of 210 and 208 in FIG. 5C.

The foregoing is the basic principle of the structure and the effect of a magnetic head according to this invention. Besides, one of the more important features of this aspect of the invention is that an appropriate range of tolerance in shift of the reproducing track position is predetermined with corresponding to specification of a recording and reproducing device using a head of high permeability magnetic thin film for high density recording. Here, any head, among various applied heads, in which the width of reproducing magnetic film pole is narrower than that of recording magnetic film pole basically belongs to this invention.

Figure 19:
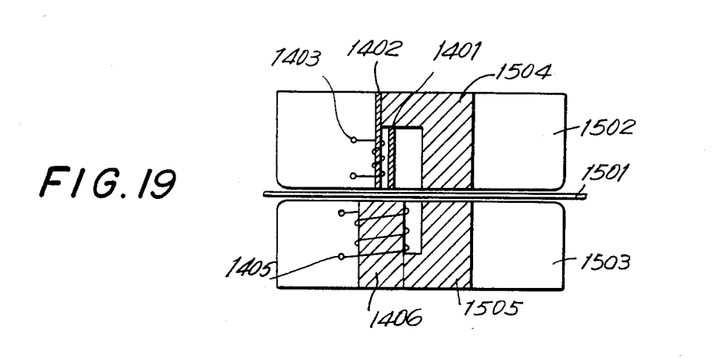

FIG. 19 depicts another embodiment of the head structure according to this invention. An upper head 1502 and a lower head 1503 are facing to each other so as to hold a medium 1501 therebetween. Upper head 1502 has the magnetic thin films 1401 and 1402 which are formed as previously described. Only the magnetic thin film 1402 has a coil 1403 around it for reproducing. Upper head 1502 has a magnetic core 1504 which is detached from magnetic thin films 1401 and 1402 in the portion facing to medium 1501 while the other portion is in contact with, or adjacent to them. Lower head 1503 has a similar magnetic core 1505 which is detached from magnetic core 1406 in the portion facing to medium 1501 while it is adjacent to it in the other portion. Therefore, the magnetic fluxes induced by the recording and reproducing current close into loops through magnetic thin films 1401 and 1402 and cores 1406, 1504 and 1505 to enhance the efficiency of recording and reproducing. Besides, the S/N ratio of reproduced signals is not affected with the external magnetic field. Cores 1406 and 1505 can also be composed in one body.

Figure 20:
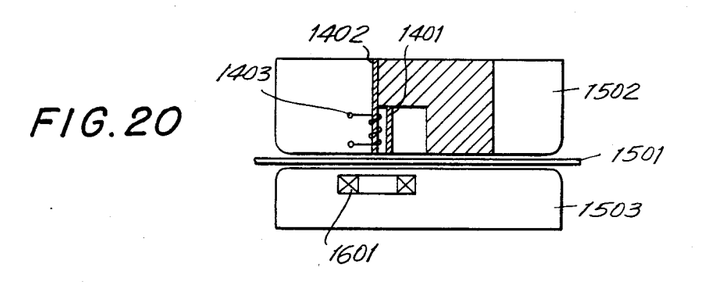

FIG. 20 shows another embodiment of a head structure according to this invention. A lower head 1503 has a recording coil 1601 without a magnetic core. In the recording process, the magnetic field produced by coil 1601 is concentrated to the tips of the films 1401 and 1402 to magnetize the medium 1501 near them.

Figure 21:
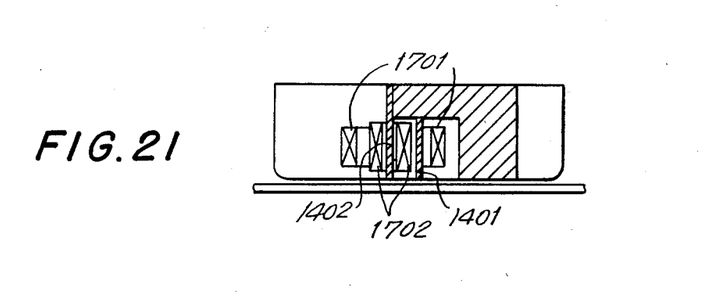

FIG. 21 depicts still another embodiment of a head structure according to this invention. A head structure according to this embodiment has no lower head. In this structure, a recording coil 1701 is wound around magnetic films 1401 and 1402 so as to make them a substantial magnetic core. A coil for reproducing is wound around only film 1402 similarly to a head according to the above-described embodiments.

Figure 22:
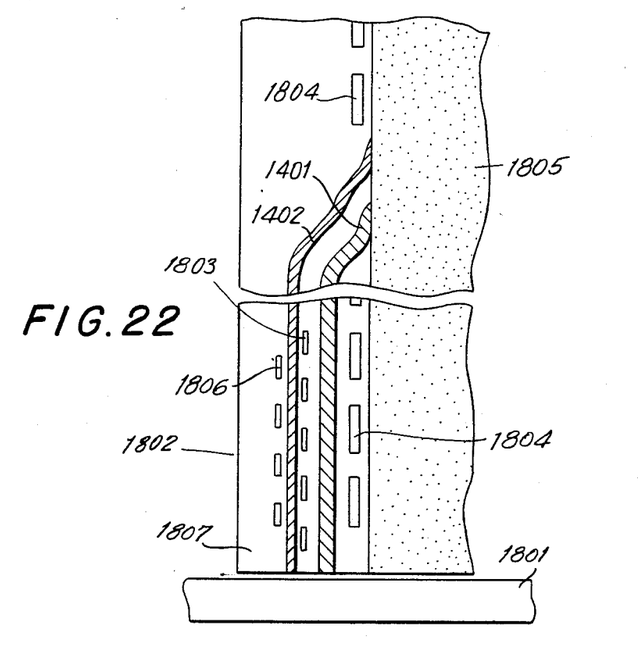

FIG. 22 is a cross-sectional view taken in the direction of the track of the head of FIG. 21. In this embodiment, a coil is made with thin film as well as with magnetic films 1401 and 1402. A medium 1801 is shown as is a magnetic core 1805 made of Ni-Zn sintered ferrite. A coil 1804 corresponding to the coil 1701 for recording is made with aluminium thin film and spirally formed on core 1805. A thin film of aluminium is first formed on a substrate by evaporation and then such a spiral pattern is made by etching a thin aluminium film in photolithographic process. Subsequently, the high permeability magnetic film 1401, an insulating layer, conducting pattern 1803 which is the lower part of coil 1702, insulating layer, magnetic thin film 1402, insulating layer and conducting pattern 1806 which is the upper part of coil 1702 are piled up in order by etching process. Patterns 1803 and 1806 are connected to each other at the portion where they are not in touch with magnetic film 1402 to form a coil structure around film 1402. Magnetic films 1401 and 1402 are adjacent to magnetic core 1805 in the middle of coil 1804. A protecting layer 1807 is finally deposited after forming all of the above mentioned layers. At this final stage, one can take process to make a floating head slider for magnetic discs on the section where the thin films appear. Otherwise, if some slider material is bonded on the protecting layer, such a head for a floppy disc or a tape as shown in FIG. 20 can be provided.

Figure 23:
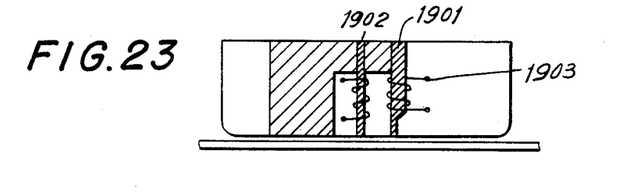

Another example of a head according to this invention is shown in FIG. 23, in which thin films 1901 and 1902 repectively correspond to thin films 1401 and 1402 in FIG. 7. Only magnetic film 1901 has a coil 1903 for recording around it. Therefore, magnetic film 1902 is not energized at the time of recording and thus only the area on the medium in contact with film 1901 is magnetized. Moreover, to make film 1901 thinner at the portion near the medium provides the stronger recording magnetic field, which leads to enhanced efficiency. On the other hand, the reproducing magnetic film does not need any variation in its thickness. The basic principle of recording and reproducing with this head corresponds to that of the above-described embodiment with reference to FIGS. 18A and 18B.

In accordance with the present invention, an improved magnetic recording and reproducing head is provided which operates in a perpendicular magnetization mode. High permeability magnetic thin films are utilized to permit high density recording and reproducing. Several different constructions are proposed to meet different operating circumstances and tolerances.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magnetic recording and reproducing head for recording and reproducing information of a magnetic recording medium comprising first and second members spaced apart so as to define a gap therebetween through which said magnetic recording medium can travel, said first member including a first magnetic pole of high permeable magnetic thin film having a tip which faces said magnetic recording medium, a first coil provided around said magnetic thin film, said second member including a second coil without a magnetic core therein defining a central portion, said tip of said magnetic thin film facing said central portion of said second coil, said second coil magnetizing said magnetic recording medium to record information thereon, said first coil detecting the magnetic flux of said magnetic recording medium to reproduce said recorded information.

2. The magnetic recording and reproducing head as claimed in claim 1, wherein said first member includes a magnetic core positioned on one side of said magnetic thin film, said second member including a non-magnetic material, said second coil being supported in said non-magnetic material.

3. The magnetic recording and reproducing head as claimed in claim 2, wherein said first member further includes a second magnetic thin film of high permeability, said second thin film being positioned so as to extend generally parallel to said first magnetic thin film and generally vertical to said recording medium, the width of said recording medium where said second magnetic thin film faces being wider than the width where said first magnetic film faces.

4. The magnetic recording and reproducing head as claimed in claim 1, wherein said first coil is coupled to a reproducing circuit means for reproducing signals detected by said first coil from said magnetic recording medium, said second coil being coupled to a recording circuit means for recording signals through said second coil on said magnetic recording medium.

5. The magnetic recording and reproducing head as claimed in claim 1, wherein said magnetic recording medium includes recorded information which provides a magnetic flux, a greater portion of said magnetic flux passing through said first coil than said second coil so that said first coil can be effectively used for reproducing said recorded information.

6. The magnetic recording and reproducing head as claimed in claim 1, wherein said first member includes a first magnetic core which symetrically surrounds said magnetic thin film, said second member including a second magnetic core which surrounds said second coil but does not extend therein.

7. The magnetic recording and reproducing head as claimed in claim 1, wherein said magnetic thin film is made from Permalloy.

8. The magnetic recording and reproducing head as claimed in claim 1, wherein said width of said tip of said magnetic thin film is effectively equal to the recording track width of said magnetic recording medium.

9. The magnetic recording and reproducing head as claimed in claim 1, wherein said second member includes a non-magnetic material, said second coil being supported in said non-magnetic material.

10. The magnetic recording and reproducing head as claimed in claim 1, wherein said first member includes magnetic cores which symetrically surround said first coil, said second member including a magnetic core which surrounds said second coil.

11. A magnetic recording and reproducing head for recording and reproducing information on a magnetic recording medium comprising first and second members spaced apart so as to define a gap therebetween through which said magnetic recording medium can travel, said first member including a first magnetic pole of high permeable magnetic thin film having a tip which faces said magnetic recording medium, said second member including a second magnetic pole, a first coil provided around said magnetic thin film, said second member further including a second coil defining a central portion wound around said second magnetic pole, said tip of said magnetic thin film facing said central portion of said second coil, said first coil being coupled to a reproducing circuit means for reproducing signals detected by said first coil from said magnetic recording medium, said second coil being coupled to a recording circuit means for recording signals through said second coil on said magnetic recording medium, said second coil magnetizing said magnetic recording medium to record information thereon, said first coil detecting the magnetic flux of said magnetic recording medium to reproduce said recorded information, said first and second members each including a magnetic core which face each other across said gap at a position spaced from where said magnetic thin film and second magnetic pole face one another, said magnetic thin film and second magnetic pole each having a rear portion which extends away from said gap, said respective magnetic cores extending respectively to said respective rear portions of said magnetic thin film and said second magnetic pole, said magnetic cores looping the magnetic flux produced at the time of recording and reproducing to form a closed loop.

12. The magnetic recording and reproducing head as claimed in claim 11, wherein said first and second members are surrounded with a non-magnetic material.

13. The magnetic recording and reproducing head as claimed in claim 12, wherein conducting layers are provided on upper and lower portions of said first member proximate said magnetic thin film.

14. The magnetic recording and reproducing head as claimed in claim 13, wherein said first member includes insulating layers which insulate said first coil from said magnetic thin film.

15. The magnetic recording and reproducing head as claimed in claim 11, wherein the thickness of said magnetic thin film is about in the range of 0.1 to 1 $\mu$m.

16. The magnetic recording and reproducing head as claimed in claim 15, wherein the width of said tip is about 10 μm.

17. The magnetic recording and reproducing head as claimed in claim 11, further comprising a second thin film positioned on said first member and extending generally parallel to said first thin film, said second thin film being shorter than said first thin film, said magnetic core of said first member extending over said second thin film so that said magnetic core of said first member can extend to the rear portion of said first thin film.

18. A magnetic recording and reproducing head for recording and reproducing information on a magnetic recording medium comprising first and second magnetic thin films of high permeability each including a first end, said first and second thin films being provided on one side of said magnetic recording medium, said first ends of said first and second thin films being spaced apart to define a gap therebetween, said first and second thin films being coupled at a portion other than said first ends so that said first and second thin films define a ring-type magnetic head, said magnetic recording medium creating a magnetic flux when information is recorded thereon, said magnetic flux passing to said first ends of said first and second thin films to form a closed loop, first coil means being wound around one of said first and second thin films for detecting said magnetic flux so that said recorded information can be reproduced, said first coil means being arranged such that said first and second thin films equivalently form a magnetic core in series for said first coil means, and second coil means for effecting recording on said magnetic recording medium.

19. The magnetic recording and reproducing head as claimed in claim 18, further comprising a second member spaced from said first and second thin films on the opposite side of said magnetic recording medium, said second coil means being positioned on said second member for creating a magnetic field for recording information on said magnetic recording medium.

20. The magnetic recording and reproducing head as claimed in claim 19, wherein said second member includes a magnetic core, said second coil means surrounding said magnetic core.

21. The magnetic recording and reproducing head as claimed in claim 18, wherein said first coil means is made from a thin film.

22. The magnetic recording and reproducing head as claimed in claim 21, wherein said thin film of said first coil means is made from a material selected from the group consisting of aluminium and copper.

23. The magnetic recording and reproducing head as claimed in claim 22, wherein said first and second thin films are made of Permalloy.

24. The magnetic recording and reproducing head as claimed in claim 21, further comprising a non-magnetic base, said first thin film being formed on said non-magnetic base, insulating means supported on said first thin film, said thin film of said first coil means being formed on said insulating means, said insulating means surrounding said thin film of said first coil means, said second thin film being formed on said insulating means.

25. The magnetic recording and reproducing head as claimed in claim 18, wherein said first and second thin films are joined in a central portion thereof, said first coil means surrounding the central portion where said first and second thin films are joined, said first coil means being for reproducing, said second coil means surrounding said first and second thin films for recording.

26. The magnetic recording and reproducing head as claimed in claim 18, wherein said first portion of said first thin film is wider than said first portion of said second thin film.

27. The magnetic recording and reproducing head as claimed in claim 26, wherein said second magnetic film is longer than said first thin film.

28. The magnetic recording and reproducing head as claimed in claim 26, wherein said recording medium travels in a first direction with respect to said first and second thin films, said first thin film being downstream to said second thin film in the first direction of travel of said recording medium.

29. The magnetic recording and reproducing medium as claimed in claim 28, wherein said magnetic recording medium includes a recording track width and a reproducing track width, said recording track width being different that the width of said reproducing track.

30. The magnetic recording and reproducing head as claimed in claim 18, wherein said second coil means is positioned on the opposite side of said recording medium from said first and second thin films, said second coil means being positioned such that the first ends of said first and second thin films are essentially facing the center of said second coil means.

31. The magnetic recording and reproducing head as claimed in claim 18, wherein said second coil means is wound around said first and second thin films.

32. The magnetic recording and reproducing head as claimed in claim 18, wherein said first coil means is intermediate said first and second thin films, said first and second thin films being coupled at substantially the center of said first coil means.

* * * * *